Feb. 13, 196.  J. K. POCKNEE  3,020,752
ATTACHMENT DEVICES FOR HARDNESS TESTING INSTRUMENTS
Filed Nov. 8, 1957  2 Sheets-Sheet 1
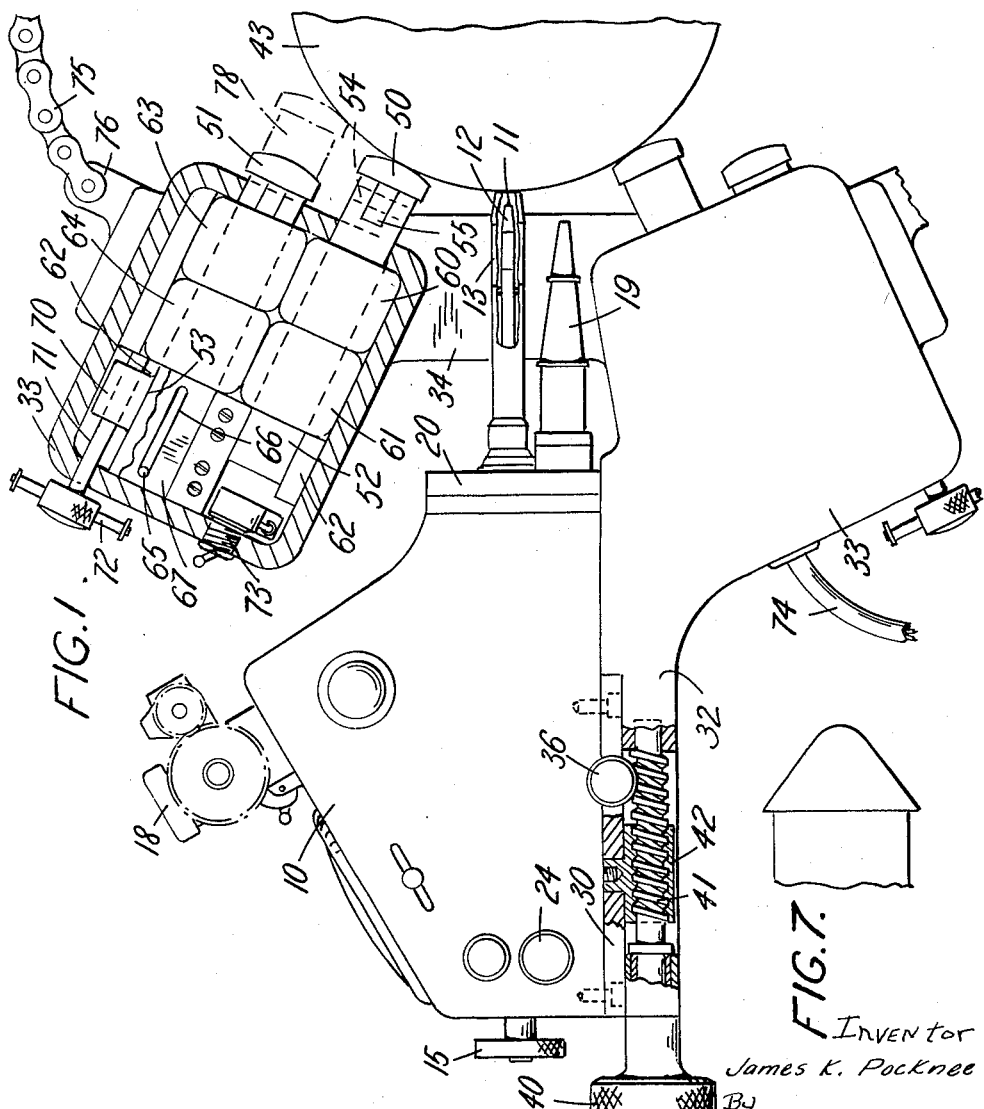

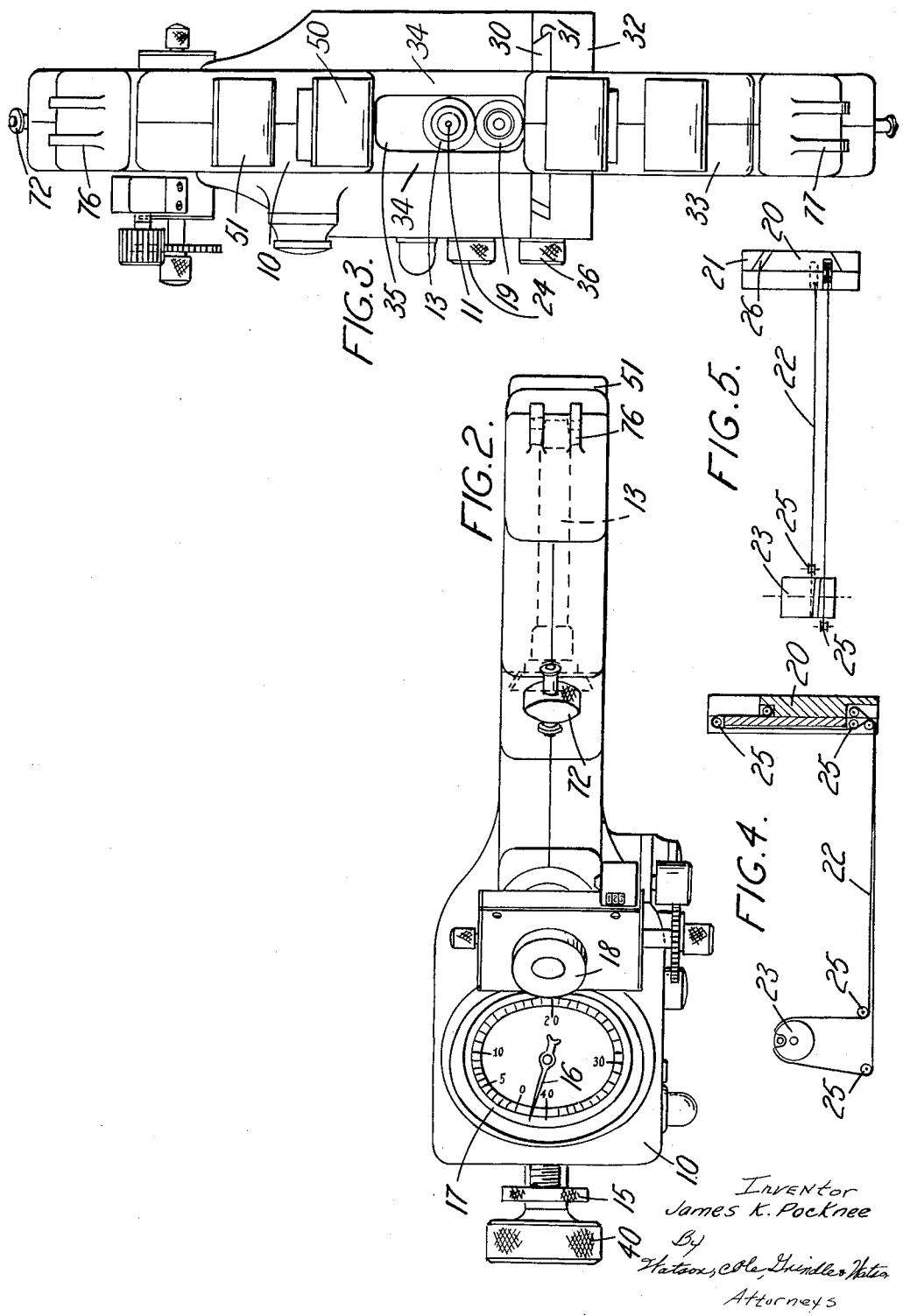

United States Patent Office 3,020,752
Patented Feb. 13, 1962

3,020,752
ATTACHMENT DEVICES FOR HARDNESS
TESTING INSTRUMENTS
James Kitchener Pocknee, Bracknell, England, assignor to Penetrascope Limited, Bracknell, England, a British company
Filed Nov. 8, 1957, Ser. No. 695,449
Claims priority, application Great Britain Nov. 8, 1956
9 Claims. (Cl. 73—81)

This invention relates to attachment devices for portable hardness testing instruments of the kind in which the test piece is indented by an indentor under a known load and has for its principal object to provide an improved form of magnetic clamping arrangement for attaching a hardness tester to a ferro-magnetic body which body may constitute the test piece or may carry the test piece.

According to this invention an attachment device for a hardness tester of the kind in which the test piece is indented by an indentor under a known load comprises a frame in which the hardness tester can be adjustably mounted so as to be movable towards and away from the test piece, and an electro-magnet or electro-magnets in said frame having at least three spaced apart pole pieces of which not more than two are fixed, and of which at least one is movably mounted so as to be movable towards and away from the test piece, whereby the pole pieces may be positioned in contact with the body constituting or carrying the test piece. Magnetic clamps are used for attaching a hardness tester to a ferro-magnetic body and, by the arrangement of the present invention, a hardness tester may be attached to bodies having a surface which is not flat since the pole pieces may be positioned so as to fit on to any surface. For example, the hardness tester may be clamped to a cylindrical rod, roll or pipe by positioning the pole pieces so that they lie on the cylindrical surface. It will be appreciated that since the pole pieces are movable, the hardness tester must be movably mounted in the frame so that the indentor can be suitably positioned against the surface of the test piece.

In one arrangement, the attachment device comprises a frame in which the hardness tester can be adjustably mounted so as to be movable towards and away from the test piece, and two electro-magnets in said frame each having two pole pieces of opposite polarity, one of the pole pieces for each electro-magnet being adjustably mounted so as to be movable towards and away from the test piece whereby all four pole pieces may be positioned in contact with the body constituting or carrying the test piece. With this arrangement each electro-magnet has two pole pieces which are of opposite polarity so completing a closed magnetic circuit through the body. The movable pole pieces are held, by the magnetic attraction, in contact with the body which is thus held rigidly in contact with the fixed pole pieces. Preferably the movable pole piece or each movable pole piece is provided with locking means whereby it may be locked in position in contact with the body constituting or carrying the test piece. The locking means may comprise, for example, cams or locking screws or wedges adjusted with screws.

Conveniently all the pole pieces lie in a single plane, the movable pole piece or pieces being movable in that plane. Four pole pieces may be necessary to ensure a firm clamping action and conveniently, in this case, the four pole pieces are arranged in a plane, for example, one above another in a vertical plane, with the two inner pole pieces fixed and the two outer pole pieces slidably mounted. The outer pole pieces are preferably movable in directions which are convergent towards the body to be clamped.

Since the pole pieces may have to make contact with surfaces which are not flat, each pole piece may have a rounded pole surface, for example, if the pole pieces lie in a single plane as described above, each pole surface may be cylindrical about an axis perpendicular to that plane. The pole pieces may be shaped according to the type of body with which they have to make contact and, if necessary, interchangeable pole pieces of different shapes may be provided.

The movable pole piece or each movable pole piece may be formed or carried on the end of a rod which is slidable in an energizing coil and, with this arrangement, the attraction between the pole piece and the ferro-magnetic body when the attachment device is placed on the test piece will cause the pole piece or pieces to move into contact with the body.

In one convenient form of construction, the aforementioned frame has an aperture through which the indentor of the hardness tester may pass and two pole pieces are arranged at either side of the indentor. In this arrangement, the indentor will have to be carried on a relatively long rod so that the indentor can protrude sufficiently far through the aperture to reach the test piece whilst the hardness tester itself remains on the other side of the frame.

The invention also includes within its scope the combination of an attachment device as described above with a hardness tester having an indentor to which a known load may be applied. In such a hardness tester, in addition to providing an indentor, it may be necessary to provide an optical system with a suitable objective lens system for examining the indentations and, for this purpose, the indentor and the objective are conveniently mounted on a turret which is slidable so that the objective can be moved into the position which the indentor occupies when the indentor is used. Both the objective and the indentor would extend through the aperture in the above described arrangement and this aperture is made of sufficient size to permit movement of the turret to bring either the indentor or the object over the indentation. If the pole pieces are arranged in a single plane, the turret may be slidable in that plane. A remote control system such as, for example, a lever linkage or gear system, or a pulley and wire system or an electrical solenoid, may be provided for moving the turret since the latter may not be readily accessible.

The combination may conveniently be slidably mounted in a support so that the hardness tester and attachment device may be suitably positioned with respect to a workpiece adjacent the support. The hardness tester may be adjustably mounted in said frame by providing a longitudinal groove forming a guide in the underside of a base plate of the tester and providing a co-operating portion on said frame slidably engaging the groove. A clamping screw may be provided for locking the hardness tester in the frame.

The following is a description of one embodiment of the invention, reference being made to the accompanying drawings, in which:

FIGURE 1 is a view in side elevation, partly in section, of a hardness tester and attachment device shown in position on a cylindrical test piece;

FIGURES 2 and 3 are respectively a plan view and front elevation of the hardness tester and attachment device of FIGURE 1;

FIGURES 4 and 5 are diagrams illustrating the method of moving an indentor and objective assembly on the hardness tester; and FIGURES 6 and 7 are side elevation views of two alternative forms of pole piece.

Referring to the drawings, there is illustrated a static thrust type of hardness tester 10 which is of known type and which may be generally similar to that described in the specifications of U.S. Patent No. 2,667,067 and British Patent No. 668,415. This hardness tester serves to apply a known thrust to an indentor having a diamond point 11 carried on a shaft 12 which is surrounded by a protective tube 13 normally extending beyond the diamond. This tube 13 forms a setting stop, being placed in contact with the piece to be tested when the hardness tester is initially being put into position so ensuring that the diamond is the required short distance from the surface to be tested. The load on the indentor is applied hydraulically under the control of a load application hand wheel 15 and this load is indicated by a pointer 16 cooperating with a scale 17 on the top of the instrument. For examining the indentation made by the diamond, there is provided a microscope system the optical elements of which comprise a viewing eye-piece 18 and an objective lens system 19. The objective lens system 19 and the indentor assembly comprising the indentor shaft 12 and the protective tube 13 are carried on a slidable turret 20 so that the objective can be positioned over the point on the test piece where the indentation has been made to enable the indentation to be viewed through the eyepiece 18. As shown in FIGURES 4 and 5, which diagrammatically indicate respectively the side elevation and plan of the turret control mechanism, this slidable turret is carried in a V-slide 21 on the face of the hardness tester and is moved up and down by means of a cable 22 which is secured on a drum 23 controlled by a manual control knob 24 (FIGURE 1), the cable passing over a number of guide pulleys 25. A gib strip 26 is provided in the V-groove of the slide.

The base of the instrument has a downwardly extending portion 30 shaped to engage in a V-slide 31 of a frame 32. This frame is formed in two parts which abut along a vertical center line as most clearly seen in FIGURE 3, these two parts being integral with casing portions 33 for two electromagnetic clamping assemblies disposed one above and one below the indentor assembly. These casing portions are joined by integral side plates 34 so that these casings 33 and the side plates 34 form an aperture 35 (FIGURE 3) through which the indentor and objective assemblies pass. The aforementioned downwardly extending portion 30 on the base of the hardness tester is slidable in the V-slide 31 in the direction of the length thereof so permitting movement of the hardness tester in the axial direction of the indentor assembly. Locking of the hardness tester in this slide is effected by means of a thumb screw 36 forcing the tester sideways against a side surface of the slide. This frame 32 also carries a focus control knob 40 on a threaded shaft 41 which engages a nut 42 for effecting focus control.

The present invention is more particularly concerned with the magnetic clamping system for clamping the tester to the body to be tested, which body is illustrated typically in FIGURE 1 as a cylindrical roll 43. Each of the casing portions 33 contains an electro-magnetic system having two pole pieces 50, 51 which, as will be described later, are of opposite polarity and which engage the surface of the body to which the hardness tester is to be clamped. The pole pieces 50, 51 are mounted on core members 52, 53 respectively and these pole pieces are interchangeable, being secured in position by means of pins 54 which engage apertures in stems 55 of the respective pole pieces. The four pole pieces are arranged to lie in a single plane with the indentor and objective as most clearly seen in FIGURE 3. In FIGURES 1 to 3, cylindrical pole pieces, all of similar shape, are shown, these pole pieces being cylindrical about an axis normal to the plane in which the four pole pieces lie. The pole pieces may be shaped according to the type of article to be tested and FIGURES 6 and 7 illustrate two alternative shapes of pole pieces.

The core member 52 is surrounded by two solenoid coils 60, 61 and extends through these two coils into a magnetic yoke member 62 which serves to complete the magnetic circuit between the two core members 52, 53, the core member 53 extending through two energising coils 63, 64 also to engage in this yoke member. The energising coils are wound so that the core members, yoke member and pole pieces form, with the body to be tested, a closed magnetic circuit, the two pole pieces thus being of opposite magnetic polarity. The core member 53 is slidably mounted in the yoke member 62 for movement in the axial direction of the core member so that the pole piece 51 can be moved from the position shown in full lines in FIGURE 1 to the position shown by the dash lines 78. Travel of the core member 53 is limited by means of a stop pin 65 which engages in slots 66 in retaining plates 67 on either side of the core member. The core member 53 can be locked in position by means of a locking cam 70 secured on a spindle 71 to be rotated by means of a tommy bar 72. A switch 73 controls the application of current to the energising coils 60, 61, 63, 64 of the two electro-magnet assemblies. The power input for the coils is taken through an input lead 74.

For use in circumstances where no electric power is available, a chain clamp 75 is provided extending from an attachment point 76 on the upper casing 33 to an attachment point 77 on the lower casing 33.

The instrument described above has been devised particularly for testing the hardness of mill rolls for rolling steel. By adjustment of the positions of the sliding pole pieces in the two electro-magnet systems, the four pole pieces may be brought into contact with a roll of relatively small diameter as shown in FIGURE 1 or with rolls of much greater diameter and it is readily possible, for example, to accommodate rolls of say 5 inches to 50 inches diameter. The frame and electromagnetic assemblies and the indentor and objective are of relatively thin width as is clearly shown in FIGURE 2 and thus the tester and attachment device can be used for attaching the tester to a roll at the bottom of a relatively deep groove and, in a typical case, the attachment device of the present invention permits of hardness testing at the bottom of a groove seven inches deep and only two inches wide. The apparatus is used by positioning the tester and clamping assembly with the two fixed pole pieces 50 in contact with the body to which the tester is to be clamped, adjusting the two movable pole pieces 51 so that they are in contact with the body and then locking these in position by means of the tommy bar 72. The tester 10 is then moved on the frame 32 until the protective tube 13 is in contact with the body to be tested and the tester is then clamped in the frame by means of the clamping screw 36. The tester can then be operated in the known way to determine the hardness of the body to be tested by applying a known load to the diamond and observing the indentation with the microscope.

I claim:

1. A magnetic clamp device for a hardness tester of the kind in which the test piece is indented by an indentor under a known load comprising a frame in which the hardness tester can be adjustably mounted so as to be movable toward and away from the test piece, electromagnetic means on said frame having at least three spaced apart pole pieces of which not more than two are fixed and of which at least one is freely movable along the axis thereof toward and away from the test piece, said pole pieces being positioned with their axes extending in directions convergent towards said test piece and clamp means operable to secure each adjustable pole piece firmly in its adjusted position in said frame.

2. A magnetic clamp device for a hardness tester of the kind in which the test piece is indented by an indentor under a known load comprising a frame in which the hardness tester can be adjustably mounted so as to be movable toward and away from a test piece carrying body, two electromagnets secured in said frame each having two pole pieces of opposite polarity, one of the pole pieces of each electromagnet being slidably mounted so as to be freely movable linearly relative to said body in directions convergent towards said body and the other two pole pieces being arranged so that they can be positioned on said body, and clamp means operable to secure each adjustable pole piece firmly in its adjusted position in said frame.

3. A magnetic clamp device as claimed in claim 2 wherein all the pole pieces lie in a single plane with the slidable pole pieces movable in that plane.

4. A magnetic clamp device as claimed in claim 2 wherein all four pole pieces are arranged in a single plane with the two inner pole pieces fixed and the two outer pole pieces slidably mounted for movement in that plane.

5. A magnetic clamp device for a hardness tester of the kind in which a test piece is indented by an indentor under a known load comprising a frame in which the hardness tester can be adjustably mounted to be movable toward and away from the test piece, two electromagnets on said frame each having a pair of pole pieces on a magnetic yoke, and an energizing coil embracing said yoke, at least one pole piece of each coil being on the end of a rod of magnetizable material slidable in the yoke, and clamp means for clamping said rods fixedly with respect to said frame, said rods being slidable relative to said test piece in convergent directions towards said test piece.

6. In combination, a hardness tester of the kind in which a test piece is indented by an indentor under a known load and a magnetic clamp for holding the test piece in a fixed position with respect to said hardness tester, said magnetic clamp comprising a frame carrying the hardness tester, which frame has an aperture through which the indentor protrudes, two electromagnets mounted on said frame and having four pole pieces arranged to face said test piece, two pole pieces being arranged on each side of said aperture and at least two of the pole pieces being linearly adjustable in position, and clamp means for clamping the adjustable pole pieces fixedly with respect to said frame in any adjusted position, said hardness tester having a turret with the indentor mounted on the turret and an optical system with an objective mounted on the turret and wherein said turret is slidably mounted on the hardness tester so that the indentor and the objective can alternatively be moved to an operative position.

7. The combination as claimed in claim 6 wherein a remote control system is provided to effect movement of said turret.

8. In combination, a hardness tester of the kind having an indentor which is forced with a known load into a test piece, and a magnetic clamp for holding the test piece in a fixed position with respect to said hardness tester, said magnetic clamp comprising a frame, means adjustably securing the hardness tester in said frame with the indentor extending toward said test piece, electromagnetic means on said frame having at least three spaced apart pole pieces of which not more than two are fixed and of which at least one is freely movable along the axis thereof, said pole pieces being positioned with their axes extending in directions convergent toward said test pieces, and clamp means operable to secure each adjustable pole piece firmly in its adjusted position.

9. In combination, a hardness tester of the kind having an indentor which is forced with a known load into a test piece, and a magnetic clamp for holding the test piece in a fixed position with respect to said hardness tester, said magnetic clamp comprising a frame, means adjustably securing the hardness tester in said frame with the indentor extending toward said test piece, two electromagnets secured in said frame each having two pole pieces of opposite polarity, one of the pole pieces of each electromagnet being slidably mounted so as to be linearly movable along their axes in directions convergent toward said test piece, and clamp means operable to secure each adjustable pole piece firmly in its adjusted position in said frame.

References Cited in the file of this patent

UNITED STATES PATENTS

| 2,643,544 | Chester | June 30, 1953 |
| 2,722,831 | Smith | Nov. 8, 1955 |

FOREIGN PATENTS

| 369,374 | France | Jan. 10, 1907 |
| 993,071 | France | July 18, 1951 |
| 1,078,262 | France | May 5, 1954 |